No. 707,013. Patented Aug. 12, 1902.
A. W. RICHARDS.
CORN HUSKER.
(Application filed Dec. 13, 1900.)

(No Model.) 2 Sheets—Sheet 1.

WITNESSES:
Jos. A. Ryan
Anne W Hart

INVENTOR
Arthur W. Richards
BY Munn & Co.
ATTORNEYS

THE NORRIS PETERS CO., PHOTO-LITHO., WASHINGTON, D. C.

UNITED STATES PATENT OFFICE.

ARTHUR W. RICHARDS, OF INDIANOLA, IOWA.

CORN-HUSKER.

SPECIFICATION forming part of Letters Patent No. 707,013, dated August 12, 1902.

Application filed December 13, 1900. Serial No. 39,731. (No model.)

*To all whom it may concern:*

Be it known that I, ARTHUR W. RICHARDS, a citizen of the United States, residing at Indianola, in the county of Warren and State of Iowa, have made certain new and useful Improvements in Corn-Huskers, of which the following is a specification.

My invention is in that class of corn-huskers which are adapted to operate upon the ears of corn after being severed from the stalk.

The invention may be applied to a harvester adapted to work in the field or may be arranged stationary in a barn or other building.

The details of construction, arrangement, and operation are as hereinafter described, reference being had to the accompanying drawings, in which—

Figure 1:
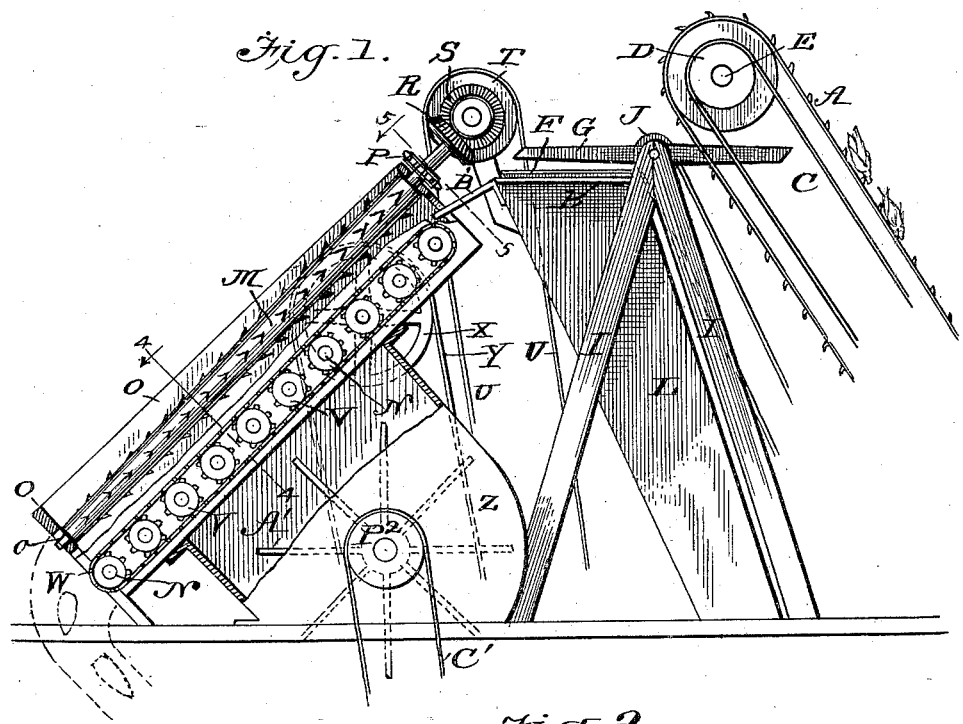
Figure 2:
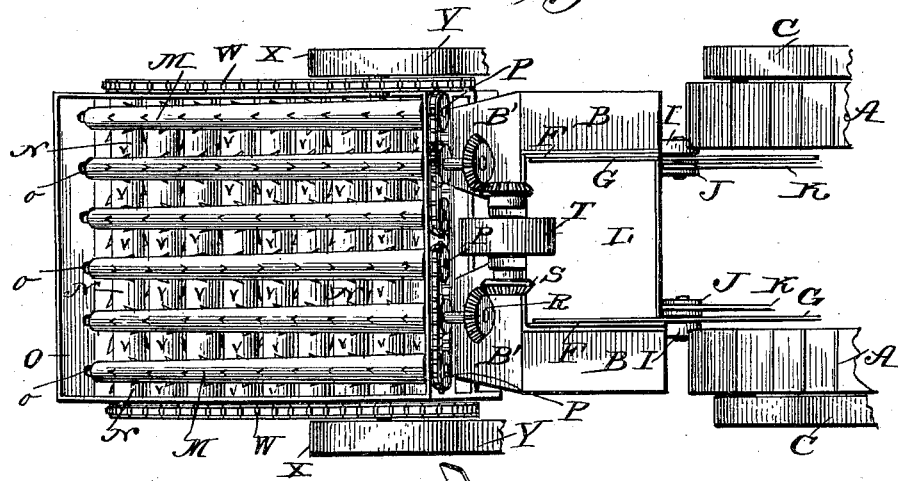
Figure 3:
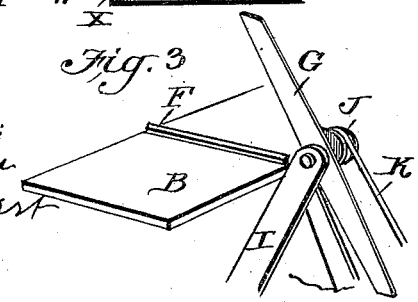
Figure 4:
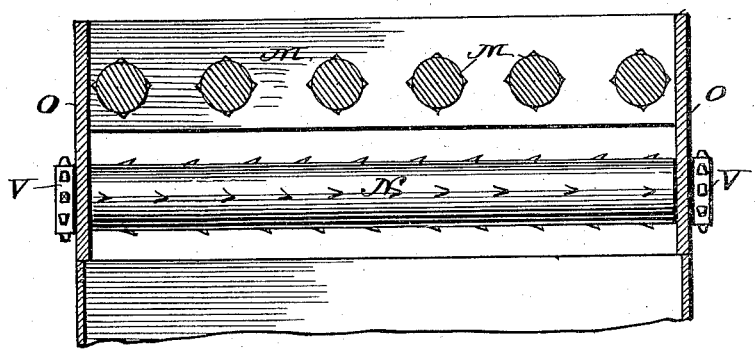
Figure 5:
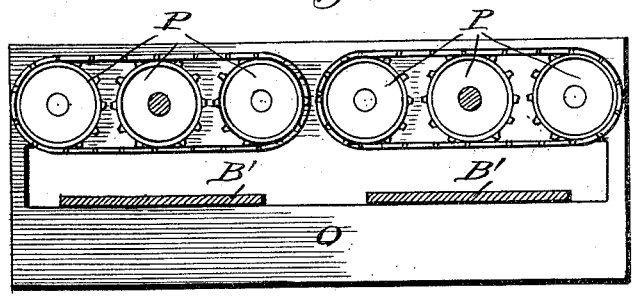
Figure 6:
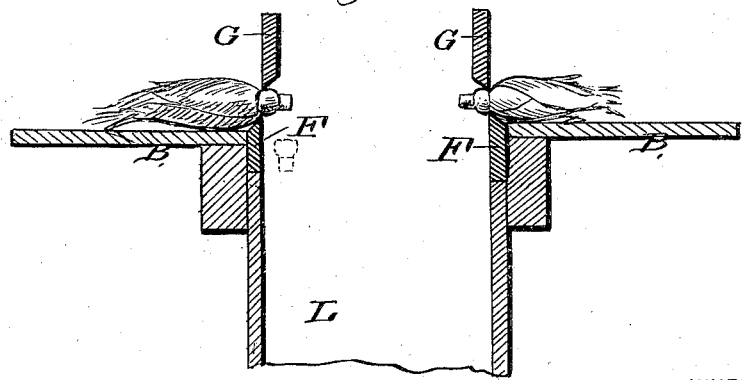

Figure 1 is in part a side view and in part a sectional elevation of my improved husking-machine. Fig. 2 is a plan view. Fig. 3 is a detail perspective illustrating the arrangement and operation of the rotary knives. Fig. 4 is an enlarged cross-section of the husking attachment proper. Fig. 5 is an enlarged cross-section on the line 5 5 of Fig. 1. Fig. 6 is an enlarged vertical cross-section illustrating the shearing action of the knives in severing the stems from the corn-ears proper.

Referring in the first instance especially to Figs. 1 and 2, it will be seen that the ears of corn which are to be husked are carried up upon endless traveling belts A, provided with teeth or other means for holding the ears temporarily, whereby they are delivered upon tables B. The said belts are arranged parallel and preferably at an angle of about thirty degrees. The tables B are arranged horizontally at such points that the ears carried up by the belts A fall thereon by gravity. The conveyers A are driven by belts C, running on pulleys D, secured to shafts E, arranged horizontally, as shown. At the inner edge of each table B (see Figs. 2 and 3) is arranged a cutter or straight-edge F, which lies horizontally and projects slightly above the edge of the table. In practice a boy stands beside each table B and holds the ears of corn in the position indicated in Fig. 6—that is to say, upon the table and with the stem of the ear resting upon a fixed blade F at a point adjacent to the butt. While the ears are so held the stems are severed by the revolving knives G. The latter are in the form of straight blades secured to and projecting on each side from a revolving stub-shaft H, which is journaled in a suitable frame or support I. A pulley J is applied to each of the shafts H, and the belt K runs thereon, whereby the cutters G are revolved rapidly, and in so doing pass close alongside or in contact with the fixed cutters F, so that they make practically a shearing cut. The boys throw the ears of corn, to which the husks still adhere, upon the inclined tables B', (see Figs. 1 and 2,) whereon they slide downward into the husking attachment proper, while the stems which have been severed fall by gravity into a chute L, arranged at a slight angle, as shown. The mouth of this chute opens between and on a level with the tables B, and its lower end is so arranged as to deliver the severed stems upon the ground in case the husker is attached to a harvester or into any suitable receptacle or place of deposit in case the husker is used in a barn or other building.

The husking attachment proper consists, as to its main features, of a set of toothed rollers M, arranged at an inclination of about thirty degrees, and a second set of toothed rollers N, arranged transversely individually, but as a whole in a plane parallel to that of the upper rollers. The latter are journaled at their ends in the rigid frame O and are adapted to rotate, as will be readily understood. They are preferably divided into two sets—that is to say, three of the said rollers are so connected as to rotate together, and the other three are similarly connected to rotate together. For this purpose a sprocket-wheel P is applied to the head of each roller, and a chain Q is arranged to run on each of the two sets of three. The axis of the central roller of each set is extended and provided with a bevel-gear R, which meshes with another gear S. The two gears S are mounted upon a shaft having a pulley T, (see Fig. 1,) upon which runs a belt U. One portion of said belt runs close to the front portion of the chute L. It is apparent that the belt U driving the pulley T the bevel-gears S will be rotated and impart rotation to the two sets of toothed rollers. The toothed rollers N are journaled in the side bars of the frame O and provided at their ends with sprocket-wheels V, upon which runs a chain W. It is apparent that by this means all the said rollers N will be rotated together by means of the chain. The axis of one of said rollers is extended laterally, and large pulleys X are mounted thereon and carry belts Y. Ordinarily one belt will suffice to drive the entire set of rollers N. It will be seen that ears of corn carried into the space between the two sets of toothed rollers will be acted upon by the former and the husks removed, while the ears proper pass on and enter a chute or passage, as shown by dotted lines, Fig. 1, wherein they are conveyed to a suitable receptacle. Since the ears of corn vary in diameter, I have adapted the toothed rollers M to rise and fall to a limited extent at their lower ends. For this purpose I provide the lower cross-bar of the frame O with transverse slots, as shown in Fig. 1, wherein the gudgeons of the rollers have the required play. It will be further noted that the toothed rollers are tapered or gradually diminished in diameter from the upper to the lower end, which construction facilitates the downward movement of the corn-ears between the two sets of rollers and their escape therefrom and also facilitates escape or discharge of the husks when free from the corn-ears. It will be understood that it is immaterial in which direction the upper rollers are rotated; but the under rollers rotate downward on their upper sides, so that the corn-ears are carried along and against the teeth of the upper rollers. The teeth of both rollers may be shorter at the upper ends of the rollers.

The fan attachment consists of a casing Z and the fan proper, A', which is arranged therein and provided with a pulley $B^2$ on one end of its axle, to which a belt C' is applied. The fan-casing Z is necessarily provided with an air-inlet, which is preferably arranged at the axis on the side opposite the pulley $B^2$. The casing is attached to the under side of the frame in which the two sets of rollers M and N are journaled, and by the action of the fan A' a blast is driven through the rollers, so as to remove therefrom the husks which have been detached from the corn-ears proper.

It is apparent that by reason of the taper of the upper rollers M the blast will have freer or more forcible discharge through the lower portion of the husking attachment proper, whereby the removal of the husks is facilitated at that point.

It is unnecessary to describe the particular means or motor by which the belts operating the several rotatable parts are driven, since this is a matter within the sphere of ordinary mechanical judgment. In case the husker is attached to a harvester power will necessarily be derived from one of the running or transporting wheels of the latter or from a special engine arranged thereon. The husks blown out by the fan A' may be allowed to fall upon the floor of the barn or other building, or a cage may be provided to receive them and from which they may be removed to be baled and used for any purpose for which they may be valuable.

My husker is distinguished by simplicity of construction, effectiveness of operation, and adaptation for use in connection with a harvester in the field or as a stationary structure.

Having thus described my invention, what I claim, and desire to secure by Letters Patent, is—

1. In a corn-husker, the combination of the series of rollers provided with pointed teeth and a second set of toothed rollers arranged at right angles to the first set and underneath the same, both sets being in downwardly-inclined parallel planes, and means for rotating them simultaneously, whereby husks adhering to the corn-ears are pierced by the teeth and shredded and stripped from the latter as shown and described.

2. In a corn-husker, the combination of the rectangular frame having transverse slots in its lower portion, two sets of rollers arranged in said frame one beneath the other and at right angles as specified, the lower journals of the upper rollers having vertical play in said slots, as shown and described.

ARTHUR W. RICHARDS.

Witnesses:
S. B. RICHARDS,
H. L. ROSS.